US012664618B2

(12) United States Patent
Zhang et al.

(10) Patent No.: US 12,664,618 B2
(45) Date of Patent: Jun. 23, 2026

(54) TECHNIQUES FOR DENOISING VIDEOS

(71) Applicant: DISNEY ENTERPRISES, INC.,
Burbank, CA (US)

(72) Inventors: Yang Zhang, Dubendorf (CH); Tunc Ozan Aydin, Zurich (CH); Christopher Richard Schroers, Uster (CH)

(73) Assignee: DISNEY ENTERPRISES, INC.,
Burbank, CA (US)

( * ) Notice: Subject to any disclaimer, the term of this patent is extended or adjusted under 35 U.S.C. 154(b) by 607 days.

(21) Appl. No.: 17/720,845

(22) Filed: Apr. 14, 2022

(65) Prior Publication Data

US 2023/0334626 A1 Oct. 19, 2023

(51) Int. Cl.
*G06T 5/70* (2024.01)
*G06N 20/00* (2019.01)
*G06T 5/73* (2024.01)

(52) U.S. Cl.
CPC .............. *G06T 5/70* (2024.01); *G06N 20/00* (2019.01); *G06T 5/73* (2024.01); *G06T 2207/20081* (2013.01)

(58) Field of Classification Search
CPC .... G06T 5/00; G06T 5/70; G06T 5/73; G06T 5/60; G06T 2207/10016; G06T 2207/20084; G06T 2207/20088
See application file for complete search history.

(56) References Cited

U.S. PATENT DOCUMENTS

| | | | | |
|---|---|---|---|---|
| 10,593,021 B1* | 3/2020 | Shen | | G06T 5/73 |
| 2003/0108250 A1* | 6/2003 | Luo | | G06T 5/75 |
| | | | | 358/518 |
| 2018/0204314 A1* | 7/2018 | Kaplanyan | | G06T 5/60 |
| 2019/0333198 A1* | 10/2019 | Wang | | G06T 5/70 |
| 2020/0111198 A1* | 4/2020 | Hiasa | | G06T 3/4023 |
| 2021/0150678 A1* | 5/2021 | Yi | | G06T 3/4046 |
| 2021/0342977 A1* | 11/2021 | Xia | | G06T 5/92 |
| 2022/0253979 A1* | 8/2022 | Kikuchi | | G06T 3/4046 |
| 2022/0398695 A1* | 12/2022 | Choi | | G06T 5/70 |

(Continued)

OTHER PUBLICATIONS

Mo et al Frequency Attention Network Blind Noise Removal for Real Images Proceedings of the Asian Conference on Computer Vision (ACCV), 2020 (Year: 2020).*

(Continued)

*Primary Examiner* — Sean T Motsinger
(74) *Attorney, Agent, or Firm* — Squire Patton Boggs LLP; Sarah Mirza

(57) ABSTRACT

Techniques are disclosed for denoising videos. In some embodiments, video frames are denoised using a denoising model that includes an encoder-decoder architecture and attention modules. During training of the denoising model, the attention modules learn weightings to upweight certain dimensions of input features to help pixel registration, remove ghosting artifacts, and improve temporal consistency when the frames of a video are being denoised. The denoising model can also be used to train a student denoising model that has a same architecture as, but is smaller and faster than, the denoising model. After training, noisy video frames can be input into the denoising model and/or the student denoising model to generate corresponding denoised video frames.

20 Claims, 8 Drawing Sheets

(56) References Cited

U.S. PATENT DOCUMENTS

| | | | | |
|---|---|---|---|---|
| 2023/0067841 A1* | 3/2023 | Saharia | | G06T 3/4007 |
| 2023/0071693 A1* | 3/2023 | Kang | | G06T 5/70 |
| 2023/0177639 A1* | 6/2023 | Chee | | G06T 5/50 |
| | | | | 382/100 |
| 2023/0186622 A1* | 6/2023 | Laszlo | | G06N 3/045 |
| | | | | 382/103 |
| 2023/0281757 A1* | 9/2023 | Zhang | | G06T 3/4007 |
| 2023/0306719 A1* | 9/2023 | Guo | | G06V 10/454 |
| 2023/0334626 A1* | 10/2023 | Zhang | | G06T 5/73 |
| 2024/0062344 A1* | 2/2024 | Duan | | G06T 5/77 |

OTHER PUBLICATIONS

Z. Yue, H. Yong, Q. Zhao, D. Meng, L. Zhang, Variational denoising network: Toward blind noise modeling and removal, in: Advances in neural information processing systems, 2019, pp. 1690-1701.

M. Maggioni, Y. Huang, C. Li, S. Xiao, Z. Fu, F. Song, Efficient multi-stage video denoising with recurrent spatio-temporal fusion, in: Proceedings of the IEEE/CVF Conference on Computer Vision and Pattern Recognition, 2021, pp. 3466-3475.

K. Dabov, A. Foi, V. Katkovnik, K. Egiazarian, Image denoising by sparse 3-d transform-domain collaborative filtering, IEEE Transactions on image processing 16 (8) (2007) 2080-2095.

V. Cornillere, A. Djelouah, W. Yifan, O. Sorkine-Hornung, C. Schroers, Blind image super-resolution with spatially variant degradations, ACM Transactions on Graphics (TOG) 38 (6) (2019) 1-13.

Y. Zhang, T. Aydn, Deep hdr estimation with generative detail reconstruction, in: Computer Graphics Forum, vol. 40, Wiley Online Library, 2021, pp. 179-190.

T. Xue, B. Chen, J. Wu, D. Wei, W. T. Freeman, Video enhancement with task-oriented flow, International Journal of Computer Vision 127 (8) (2019) 1106-1125.

A. L. Maas, A. Y. Hannun, A. Y. Ng, et al., Rectifier nonlinearities improve neural network acoustic models, in: Proc. icml, vol. 30, Citeseer, 2013, p. 3.

J. Hu, L. Shen, G. Sun, Squeeze-and-excitation networks, in: Proceedings of the IEEE conference on computer vision and pattern recognition, 2018, pp. 7132-7141.

M. Tassano, et al., "FastDVDnet: Towards Real-Time Deep Video Denoising Without Flow Estimation,", IEEE International Conference on Computer Vision and Pattern Recognition, 2020.

* cited by examiner

700

Generate first training video frames having different amounts of noise — 702

Generate second training video frames having different amounts of blurriness and noise — 704

Train denoising model using generated first and second training video frames — 706

(Optionally) Train student denoising model using trained denoising model and training video frames — 708

TECHNIQUES FOR DENOISING VIDEOS

BACKGROUND

Technical Field

Embodiments of the present disclosure relate generally to computer science and video processing and, more specifically, to techniques for denoising videos.

Description of the Related Art

Image noise refers to random variation in the color and/or brightness within images. Examples of images include standalone images and the frames of a video. Images captured by cameras can contain noise due to the mechanics of camera sensors. For example, the quality of images captured in low-lighting conditions can be adversely affected by noise. Noise can also be a byproduct in images that are rendered using Monte Carlo rendering techniques.

Image denoising is the process of removing noise from an image. Conventional approaches for image denoising can introduce unwanted artifacts into denoised images. For example, when the frames of a video are denoised according to conventional approaches, the denoised frames can have temporally inconsistent denoised regions that vary from frame to frame, even when no such variations should occur. As another example, noise and texture can "drag" from one denoised frame to another denoised frame, producing a ghost-like effect. Such artifacts that are introduced during the denoising process greatly reduce the quality of the generated denoised images.

In addition, conventional approaches for image denoising require a user to have extensive knowledge of the noise characteristics within each noisy image in order to manually specify parameters, such as the amount of noise, that are used to denoise the image. Conventional approaches can also require a user to specify a mask that indicates regions within an image where noise is present. As a general matter, manually specifying noise characteristics and masks can be tedious and time consuming.

As the foregoing illustrates, what is needed in the art are more effective techniques for denoising videos.

SUMMARY

One embodiment of the present disclosure sets forth a computer-implemented method for denoising videos. The method includes receiving a video that includes a plurality of frames. The method further includes processing one or more frames included in the plurality of frames using a denoising model to generate one or more denoised frames. The denoising model includes one or more attention module, and each attention module weights one or more dimensions of a plurality of features that are input into the attention module.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed denoising techniques relative to the prior art is that the disclosed techniques generate denoised images that include fewer unwanted artifacts relative to the denoised images produced by conventional techniques for denoising images. In addition, the disclosed techniques denoise an image without requiring the noise characteristics or a mask of an image to be previously specified. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
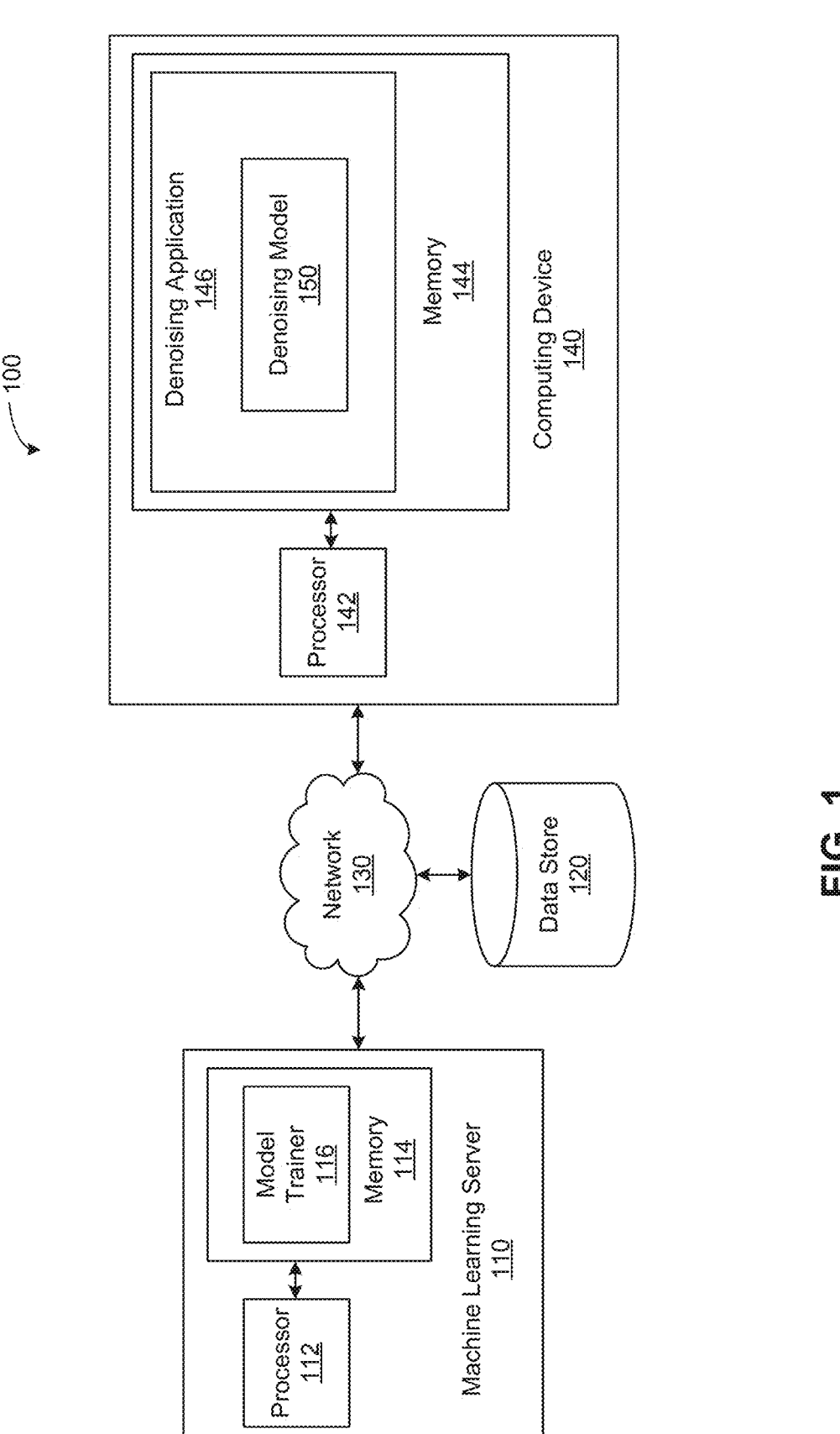
FIG. 1 illustrates a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a model trainer 116 executes on a processor 112 of the machine learning server 110 and is stored in a memory 114 of the machine learning server 110. The processor 112 receives user input from input devices, such as a keyboard, a mouse, a joystick, a touchpad, or a touchscreen.

In operation, the processor 112 is the master processor of the machine learning server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The memory 114 of the machine learning server 110 stores content, such as software applications and data, for use by the processor 112 and the GPU. The memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the memory 114 may be modified as desired. Further, the connection topology between the various units in FIG. 1 may be modified as desired. In some embodiments, any combination of the processor 112, the memory 114, and a GPU may be replaced with any type of virtual computing system, distributed computing system, or cloud computing environment, such as a public, private, or a hybrid cloud.

As discussed in greater detail below, the model trainer 116 is configured to train machine learning models, including a denoising model 150 and optionally a student denoising model (not shown). Architectures of the denoising model 150 and the student denoising model, as well as techniques for training the same, are discussed in greater detail below in conjunction with FIGS. 2-3, 5, and 7-8. Training data and/or trained machine learning models, including the denoising model 150 and/or the student denoising model, can be stored in the data store 120. In some embodiments, the data store 120 can include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120.

The trained denoising model 150 and/or the student denoising model can be deployed to any suitable applications that denoise images, such as video frames and/or standalone images. Illustratively, a denoising application 146 that utilizes the denoising model 150 is stored in a memory 144, and executes on a processor 142, of the computing device 140. For example, the denoising application 146 could be a live-action denoising application that is used to denoise videos early in the video processing pipeline after a debayering process in which viewable video frames are generated from raw files. Components of the computing device 140, including the memory 144 and the processor 142, may be similar to corresponding components of the machine learning server 110.

The number of machine learning servers and application servers may be modified as desired. Further, the functionality included in any of the applications may be divided across any number of applications or other software that are stored and execute via any number of devices that are located in any number of physical locations.

Denoising Videos

Figure 2:
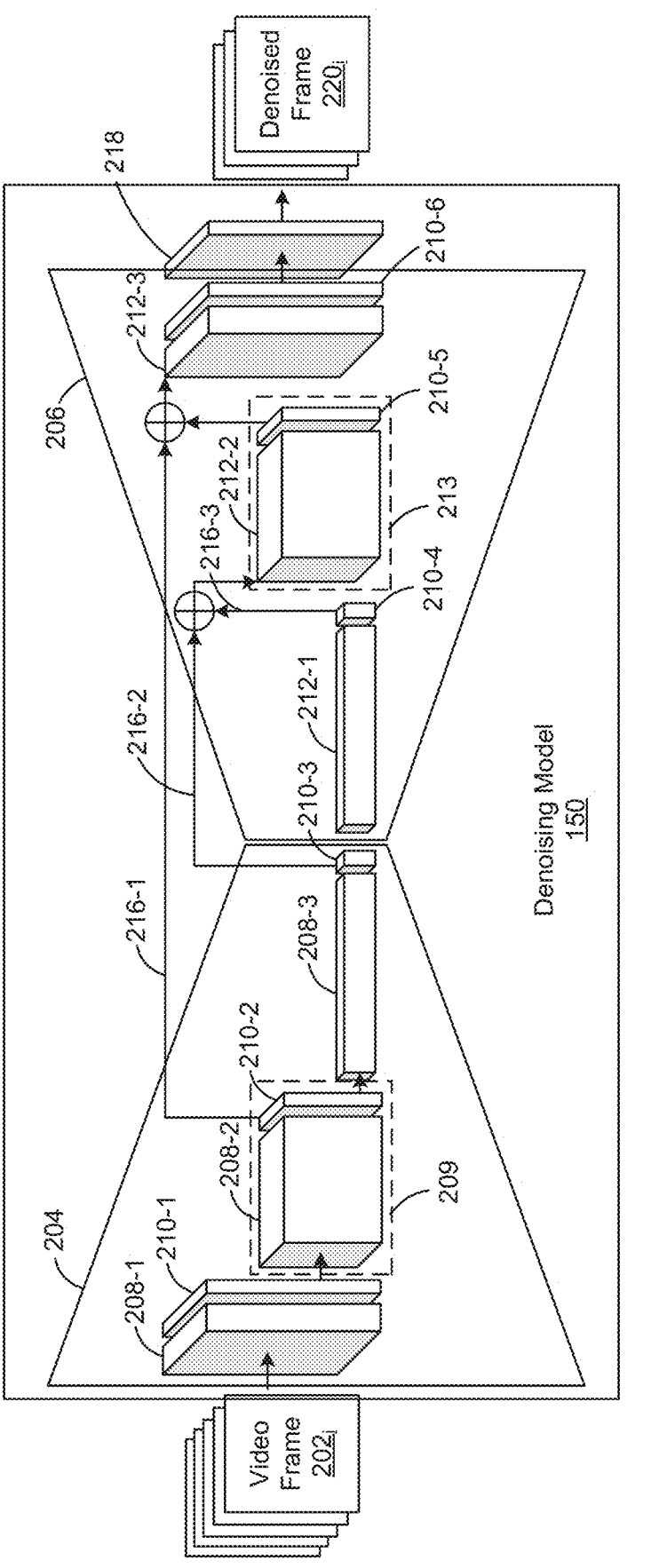
FIG. 2 illustrates in greater detail the denoising model of FIG. 1, according to various embodiments.

FIG. 2 is a more detailed illustration of the denoising model 150 of FIG. 1, according to various embodiments. As shown, the denoising model 150 receives as inputs a number of consecutive frames 2021 (referred to herein collectively as frames 202 and individually as a frame 202) of a video and outputs a number of consecutive denoised frames 220$_i$ (referred to herein collectively as denoised frames 220 and individually as a denoised frame 220). The denoising model 150 can receive any technically feasible number (e.g., five) of frames 202 as input and output any technically feasible number (e.g., three or one) of denoised frames 202. The frames 202 can be input as RGB (red, green, blue) channels of the frames 202 in some embodiments. In some embodiments, denoising model 150 can optionally also receive as inputs one or more user-specified control maps (not shown) that enable artistic control of the denoising process. For example, in some embodiments, two control maps can be used to indicate, on a per-pixel level, an amount of denoising (i.e., a denoising strength) of the input video frames and an amount of sharpening to perform on the input video frames.

In some embodiments, the denoising model 150 includes an encoder-decoder architecture, similar to a U-Net model. Illustratively, an encoder 204 of the denoising model 150 includes a number of encoder blocks that each include a residual three-dimensional (3D) convolutional layer 208-1, 208-2, or 208-3 and an attention module 210-1, 210-2, or 210-3. For example, encoder block 209 includes the 3D convolutional layer 208-2 and the attention module 210-2. The encoder block 209 is discussed in greater detail below in conjunction with FIG. 3. A decoder 206 of the denoising model 150 includes a number of decoder blocks that each include a residual three-dimensional (3D) convolutional layer 212-1, 212-2, or 212-3 and an attention module 210-4, 210-5, or 210-6. For example, decoder block 213 includes the 3D convolutional layer 212-2 and the attention module 210-5. In addition, the denoising model 150 includes skip connections 216-1, 216-2, and 216-3 between the encoder blocks and the decoder blocks. The encoder 204 and the decoder 206 of the denoising model 150 are examples shown for illustrative purposes. In some embodiments, the encoder and the decoder of a denoising model can include any technically feasible number of encoder blocks and decoder blocks, respectively. In addition, each encoder block and each decoder block can include any technically feasible number of convolutional layers and attention modules.

In operation, the encoder blocks of the denoising model 150 (e.g., encoder block 209) encode RGB pixels into a low-dimensional latent representation, which can then be decoded by the decoder blocks (e.g., decoder block 213) to generate the denoised frames 220. In some embodiments, each level of the denoising model 150 extracts features that are included in a 5-dimensional tensor of size $b \times c \times t \times w \times h$, where b is the batch size, c is the feature/channel dimension, t is the temporal dimension, and h, w is the spatial size of the tensor. The features are convolved with 3D convolution kernels in the encoder and decoder blocks, as discussed in greater detail below, and the temporal dimensional is useful for modeling temporal information such as motion directions and correspondences between consecutive input frames 202.

The skip connections 216-1, 216-2, and 216-3 from each encoder block to each corresponding decoder block are used for better local detail information reconstruction during the decoding. In addition, element-wise addition of the convolutional layers 208-1, 208-2, or 208-3 in the encoder and corresponding decoder layers 212-1, 212-2, or 212-3 can be applied. The denoising model 150 can be trained using Leaky ReLU activation in some embodiments, as discussed in greater detail below in conjunction with FIG. 5.

In some embodiments, the encoder blocks of the denoising model 150 sub-sample the spatial resolution in a feature space by a factor of 2 at each level of the encoder blocks. The feature space is a space of features output by a previous layer of the denoising model 150, or that are input as the RGB channels of the video frames 202 and (optional) user-specified control maps in the case of the convolutional layer 208-1 of the first encoder block. In addition, the number of feature channels can be doubled in each successive encoder block. For example, the convolutional layer 208-1 of the first encoder block could take as inputs RGB image channels of the video frames 202 plus two control maps that indicate, on a per-pixel basis and using values between 0 and 1, the amount of denoising and the amount of sharpening to perform. Then, the convolutional layer 208-1 of the first encoder block could sub-sample the spatial resolution of the RGB images by a factor of 2 to generate features, after which the attention module 210-1 of the first encoder block generates weights to upweight certain of the features that are helpful for pixel registrations, ghosting artifact removal, and improving temporal consistency in the video denoising process. The weighted features are then input into the next encoder block that includes the convolutional layer 208-2 and the attention module 210-2, and so forth.

Conversely, the decoder blocks (e.g., decoder block 213) of the denoising model 150 up-sample the spatial resolution in a feature space by a factor of 2 at each level of the decoder blocks via a process that is the opposite of the encoding process, described above. In addition, the number of feature channels can be halved in each successive decoder block. In some embodiments, spatial and temporal features are modeled simultaneously by the encoder blocks and the decoder blocks. Doing so allows the denoising model 150 to generate denoised frames 220 that are relatively consistent and realistic, in both the spatial and temporal domains.

In addition, the denoising model 150 includes a temporal feature fusion layer 218 that aggregates the feature map outputs of the decoder blocks after the feature map outputs have been aggregated in the temporal domain. The temporal feature fusion layer 218 helps to refine and merge filtered/denoised features present in multiple frames in order to generate the final denoised color frames 220. For example, the temporal feature fusion layer 218 could generate nine channels, namely the RGB channels corresponding to three consecutive denoised frames 220.

Figure 3:
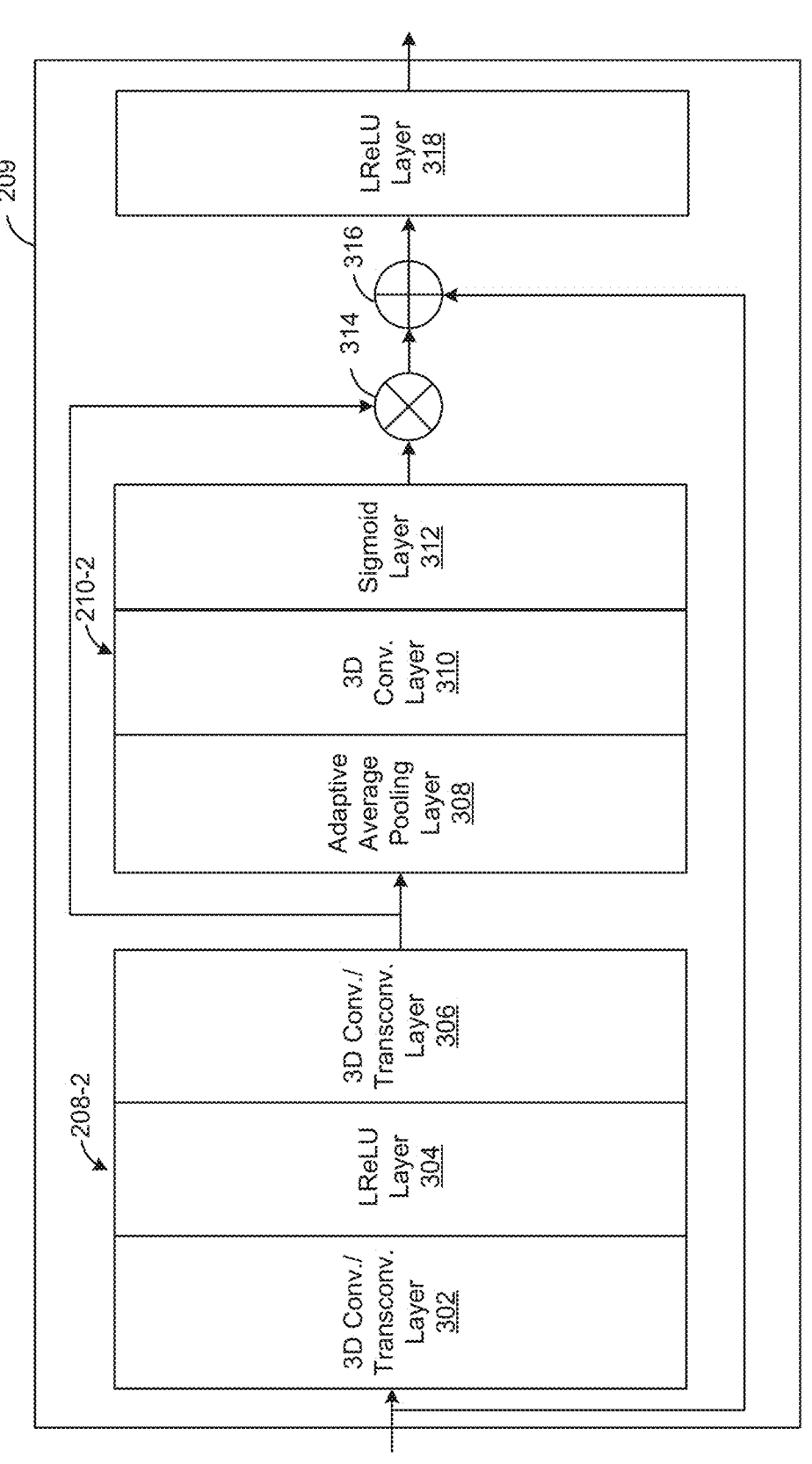
FIG. 3 illustrates in greater detail a denoising block of FIG. 2, according to various embodiments.

FIG. 3 illustrates in greater detail the encoder block 209 of FIG. 2, according to various embodiments. As shown, the 3D convolutional layer 208-2 includes a 3D convolution/transconvolution layer 302, an activation layer (shown as LReLU layer 304) that outputs weights between 0 and 1, and another 3D convolution/transconvolution layer 306. The attention module 210-2 includes an adaptive average pooling layer 308, a 3D convolution layer 310, and an activation layer that is shown as sigmoid layer 312. In operation, an output of the 3D convolutional layer 208-2 is multiplied, at operation 314, by an output of the attention module 210-2, and the resulting product is added, at operation 316, to the features in a latent space that are input into the denoising block 209. Then, the resulting sum is passed through another activation layer that is shown as LReLU layer 318.

The feature weighting at operation 316 provides a self-attention mechanism in deep learning for detection and classification. In some embodiments, the attention module 210-2 learns a weighting to upweight certain corresponding dimensions of the input features that are helpful for pixel registrations, ghosting artifact removal, and improving temporal consistency in video denoising. That is, the attention module 210-2 learns to register pixels in moving objects and reduces ghosting artifacts and unwanted motion of objects in video frames. Further, to reduce ghosting artifacts, the attention module 210-2 (and each of the other attention modules 210-1, 210-3, 210-4, 210-5, and 210-6) operates on a channel-spatial dimension, rather than only a channel dimension, in some embodiments. That is, the attention modules 210-1, 210-2, 210-3, 210-4, 210-5, and 210-6 calculate weights for each feature channel as well as spatially so that if there is a fast moving object in the frames being denoised, ghosting artifacts will not be introduced. In some embodiments, the weights can be calculated via a series of operations of average pooling, 3D convolutional layer, and sigmoid activation. In some embodiments, the channel-spatial attention can be calculated for each pixel of the frames.

Figures 4A, 4B, 4C:
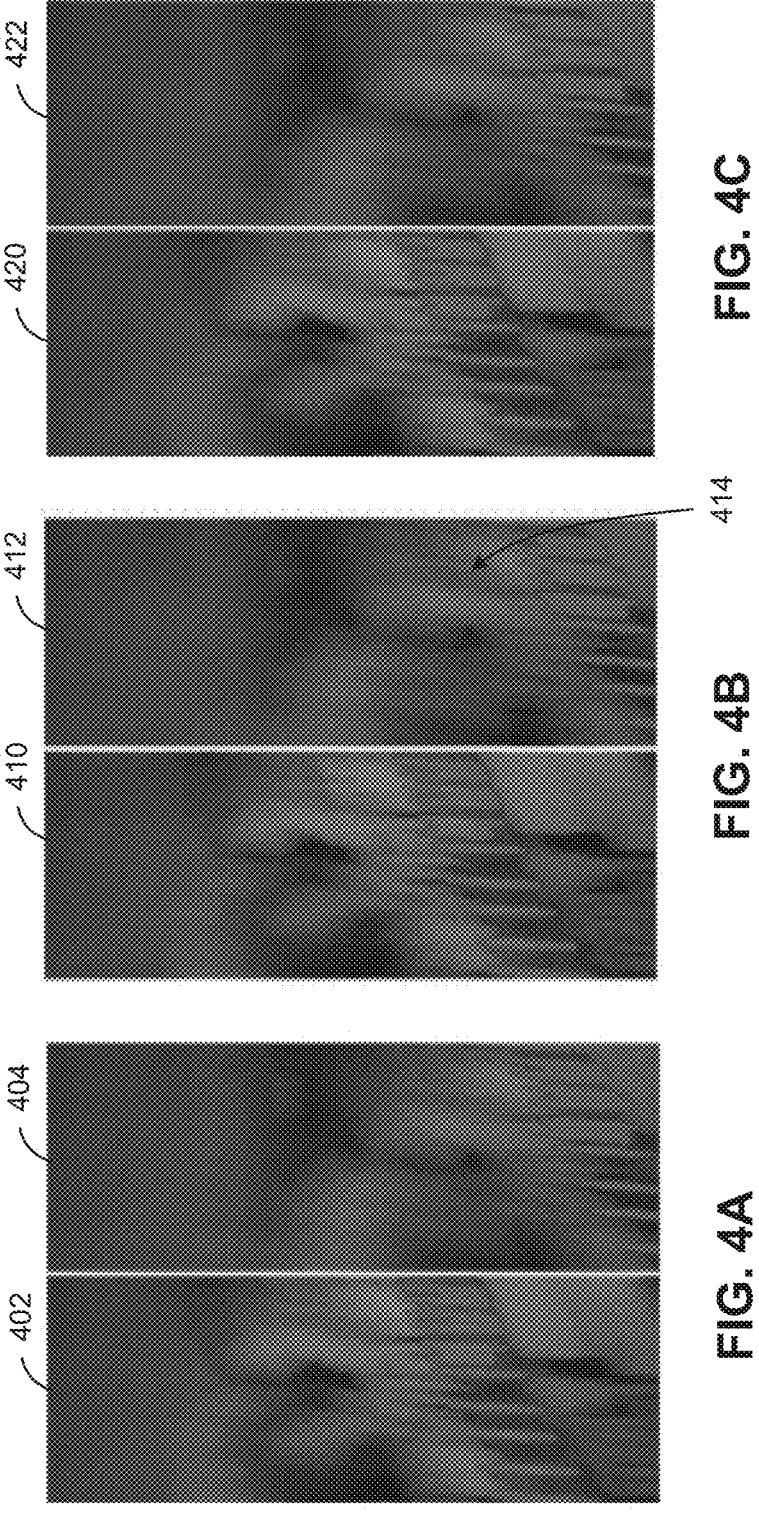
FIG. 4A illustrates exemplar reference frames of a video, according to various embodiments.
FIG. 4B illustrates exemplar denoised frames of a video generated by a denoising model that includes a channel attention module, according to various embodiments.
FIG. 4C illustrates exemplar denoised frames of a video generated by a denoising model that includes a channel-spatial attention module, according to various embodiments.

FIGS. 4A-4C illustrate a comparison of exemplar reference frames of a video with exemplar denoised frames that are generated by denoising models that include a channel attention module and a channel-spatial attention module, according to various embodiments. FIG. 4A illustrates exemplar reference frames 402 and 404 of a video. The reference frames 402 and 404 are clean frames that do not include noise, and denoised frames can be compared with the reference frames 402 and 404.

FIG. 4B illustrates exemplar denoised frames 410 and 412 generated by a denoising model that includes a channel attention module. The denoised frames 410 and 412 were generated by denoising noisy versions of the reference frames 402 and 404, described above in conjunction with FIG. 4A. As shown, the frame 412 includes ghosting artifacts, such as ghosted text 414 where there should be no text.

FIG. 4C illustrates exemplar denoised frames 420 and 422 of a video generated by a denoising model that includes a channel-spatial attention module, such as the attention module 210-1, 210-2, 210-3, 210-4, 210-5, or 210-6. The denoised frames 420 and 422 were also generated by denoising noisy versions of the reference frames 402 and 404, described above in conjunction with FIG. 4A. As shown, the denoised frame 422 does not include the ghosting artifacts that are in the denoised frame 412, described above in conjunction with FIG. 4B, and the denoised frame 422 is closer to the clean frame 404 than the denoised frame 412, described above in conjunction with FIG. 4B.

Figure 5:
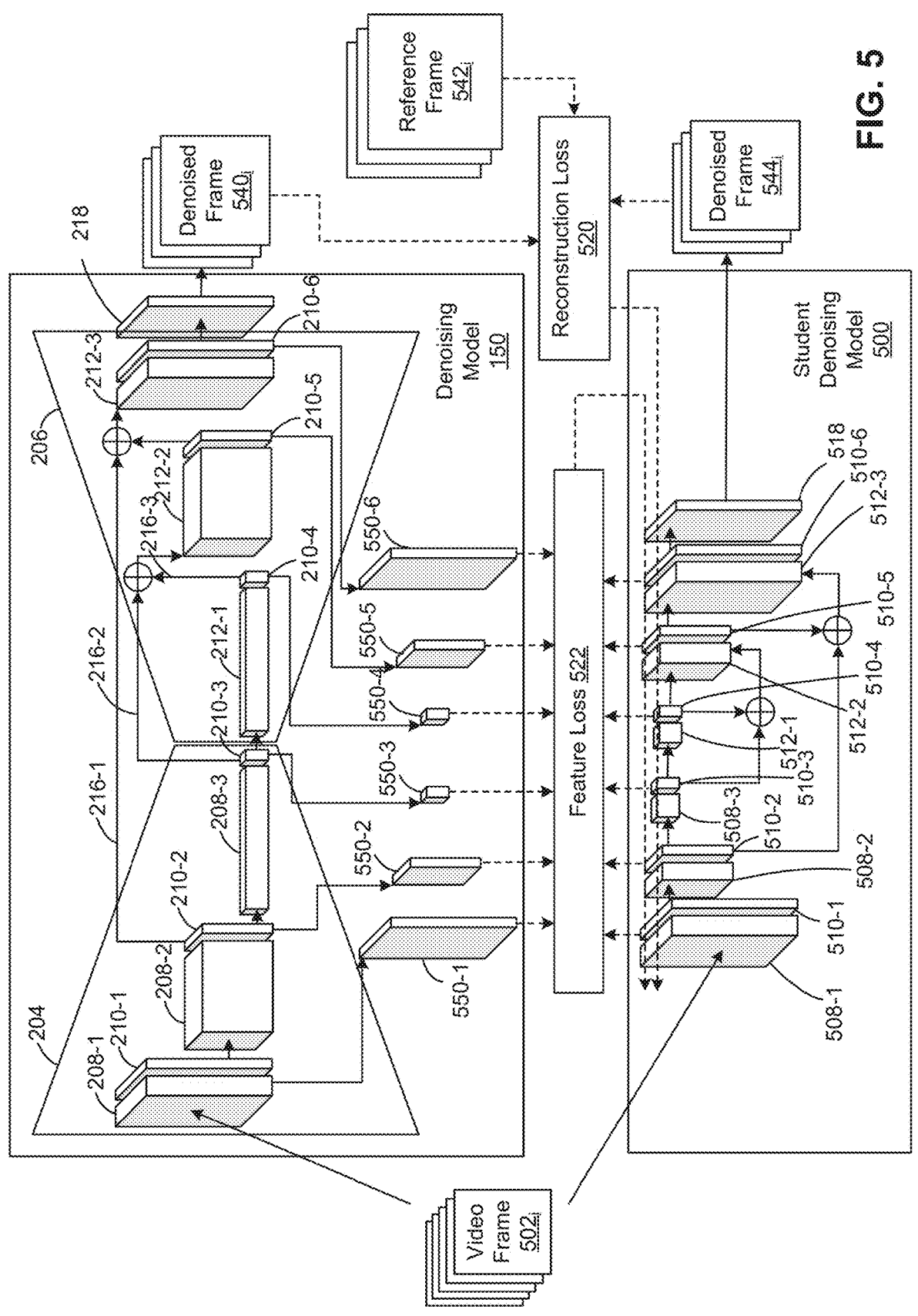
FIG. 5 illustrates an approach for training a denoising model and a student denoising model, according to various embodiments.

FIG. 5 illustrates an approach for training the denoising model 150 and a student denoising model 500, according to various embodiments. As shown, the denoising model 150 can be trained using training data that includes noisy video frames 502₁ (referred to herein collectively as noisy frames 502 and individually as a noisy frame 502) and corresponding reference frames 542₁ (referred to herein collectively as reference frames 542 and individually as a reference frame 542). In some embodiments, to generate the training data, the model trainer 116 generates (1) noisy frames that include different amounts of noise, and (2) noisy frames that include different amounts of blur. Using such training data, the denoising model 150 can learn to apply different amounts of denoising and sharpening to video frames. Thereafter, the amount of denoising and the amount of sharpening to perform can be specified via control maps, described above in conjunction with FIG. 3. To generate the noisy frames that include different amounts of noise for training the denoising model 150, the model trainer 116 adds different amounts of any technically feasible type of noise, such as Gaussian noise, to a set of reference frames (e.g., a set of reference frames that includes the reference frames 542). To generate the noisy frames that include different amounts of blur, the model trainer 116 adds different amounts of any technically feasible type of blur, such as Gaussian blur, to a set of reference frames (e.g., a set of reference frames that includes the reference frames 542). In addition, the model trainer 116 adds noise to the blurred frames.

In some embodiment, the denoising model 150 is trained using any technically feasible technique, such as backpropagation and gradient descent, to minimize a loss function that includes (1) a pixel reconstruction loss term 520 that penalizes per-pixel differences between denoised frames 5401 (referred to herein collectively as denoised frames 540 and individually as a denoised frame 540) that are generated by the denoising model 150 being trained and corresponding reference frames, and (2) a temporal stabilization term that penalizes differences between the residuals of consecutive denoised frames that are generated by the denoising model 150 being trained and the residuals of corresponding consecutive reference frames. More formally, the loss function, which is denoted herein by $\mathcal{L}$, can be a hybrid loss function that includes a pixel reconstruction loss term $\mathcal{L}_{rec}$ and a temporal stabilization loss term:

$$\mathcal{L} = \alpha_1 \mathcal{L}_{rec} + \alpha_2 \mathcal{L}_{temp}, \qquad (1)$$

where the coefficients $\alpha_1 = 1$ and $\alpha_2 = 0.5$ in some embodiments. The pixel reconstruction loss term $\mathcal{L}_{rec}$ is designed to guide the denoised image, $\hat{x}$, to be as close as possible to the corresponding reference image, x, in the spatial domain by minimizing the $L^1$ distance:

$$\mathcal{L}_{rec} = \frac{1}{n} \sum_{i=1}^{n} |x - \hat{x}|, \qquad (2)$$

where i is the pixel index and n refers to the total number of pixels.

In order to reduce temporal inconsistency artifacts in denoised video frames, a temporal stabilization loss term $\mathcal{L}_{temp}$ can be defined as an aggregated $L^1$ distance of the residuals of each two consecutive frames from the denoised ($\hat{R}$) and reference frames (R) in each batch of training data. For example, for a three-frame noisy input, the temporal stabilization loss term $\mathcal{L}_{temp}$ can be expressed as:

$$\mathcal{L}_{temp} = \sum_{j=1}^{n} \left( \|R_{t,t-1} - \hat{R}_{t,t-1}\| + \|R_{t,t+1} - \hat{R}_{t,t+1}\| + \|R_{t-1,t+1} - \hat{R}_{t-1,t+1}\| \right), \qquad (3)$$

where t denotes the frame index, j is the index of the training pair, and n denotes the number of training images in each training batch. Experience has shown that using an $L^2$ norm for the temporal stabilization loss term $\mathcal{L}_{temp}$ produces similar temporally coherent results with slightly blurrier spatial results than using a $L^1$ norm, although the peak signal-to-noise ratios are similar.

In some embodiments, a recurrent training strategy can be employed in which two consecutive blocks that each include a given number (e.g., five) of consecutive frames are input into the denoising model 150 at each time step to generate two sets of consecutive denoised frames. In such a case, the first block can include noisy frames, while the second block can include a first frame that is the last denoised frame from the first block and the remaining frames are noisy frames. A loss (e.g., the loss of equation (1)) is then calculated for the two blocks and backpropagated through the denoising model 150 to train the denoising model 150. Doing so can help stabilize the denoising results of consecutive blocks so that there are fewer (or no) temporal inconsistencies across the frames of consecutive blocks.

In order to achieve faster inference speed after the denoising model is trained, while not compromising denoising quality, a knowledge distillation (KD) training scheme can be used in some embodiments to train a student denoising model (e.g., student denoising model 500) that is smaller and faster than the denoising model 150, which is also referred to herein as the "teacher" model. As shown, the student denoising model 500 includes the same architecture as the denoising model 150. In particular, the student denoising model 500 includes 3D convolutional layers 508-1, 508-2, and 508-3; 3D deconvolution layers 512-1, 512-2, and 512-3; attention modules 510-1, 510-2, 510-3, 510-4, and 510-5; and a temporal feature fusion layer 518, which are similar to the 3D convolutional layers 208-1, 208-2, and 208-3; 3D deconvolution layers 212-1, 212-2, and 212-3; attention modules 210-1, 210-2, 210-3, 210-4, and 210-5; and temporal feature fusion layer 218, respectively, described above in conjunction with FIGS. 2-3, except the student denoising model 500 can have different hyperparameters than the denoising model 150. In some embodiments, the different hyperparameters of the student denoising model 500 can include encoder blocks that do not sub-sample the spatial resolution in a feature space by a factor of 2 at each level of the encoder blocks or increase the number of channels in deeper encoder blocks of the student denoising model 500, as well as fewer weights in the layers of the student denoising model 500 (e.g., ¼ as many weights).

In some embodiments, the student denoising model 500 is trained using the denoising model 150 and 3D convolution adaptation layers with 1×1 kernels, shown as adaptation layers 550-1, 550-2, 550-3, 550-4, 550-5, and 550-6. The adaptation layers 550-1, 550-2, 550-3, 550-4, 550-5, and 550-6 are used to convert the dimensions of corresponding layers, shown as the attention module 210-1, 210-2, 210-3, 210-4, 210-5, and 210-6, of the denoising model 150 to the same dimensions as corresponding layers, shown as attention modules 510-1, 510-2, 510-3, 510-4, 510-5, and 510-6 of the student denoising model 500 so that a feature loss 522 can be calculated. The training minimizes a loss function that includes a feature loss 522 term $\mathcal{L}_{feature}$ that regularizes the difference between distilled feature information from an adaptation layer $\mathcal{A}$ of the denoising model 150 and feature maps from the student denoising model 500. The feature loss term encourages the student denoising model 500 to learn similar feature representations as the distilled representations from the denoising model 150:

$$\mathcal{L}_{feature} = \|\mathcal{A}(F_{teacher}) - F_{student}\|_2^2, \qquad (4)$$

where $F_{teacher}$ and $F_{student}$ represent the feature maps from the denoising model 150 and the student denoising model 500, respectively. Additionally, in some embodiments, the student denoising model 500 can be trained to optimize the $L^1$ reconstruction loss $\mathcal{L}_{rec}$:

$$\mathcal{L}_{rec} = \lambda \mathcal{L}_{hard}(x, \hat{x}_{student}) + (1 - \lambda) \mathcal{L}_{soft}(\hat{x}_{teacher}, \hat{x}_{student}), \qquad (5)$$

where $\mathcal{L}_{hard}$ is a hard loss using reference image x and a denoised image, shown as denoised frame 5441, from student denoising model 500 $\hat{x}_{student}$, and $\mathcal{L}_{soft}$ is a soft loss using the denoising model 150 prediction $\hat{x}_{teacher}$ and $\lambda$ is a parameter to balance the hard and soft losses. Larger teacher models, such as the denoising model 150, can learn to better fit training data and perform better on test data. The soft targets include learned latent information about the reference image representation as discovered by the denoising model 150. Learning from the soft targets can help the student denoising model 500 inherit the latent information from the denoising model 150. In addition, experience has shown that the student denoising model 500 can be two times faster in denoising video frames than the denoising model 150.

Figure 6B:
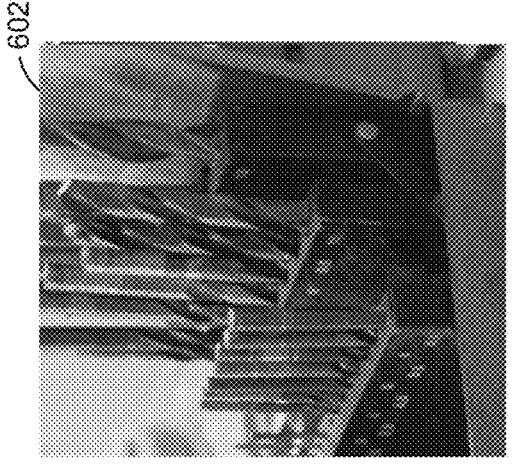
FIG. 6B illustrates an exemplar denoised image generated by a denoising model, according to various embodiments.
Figure 6A:
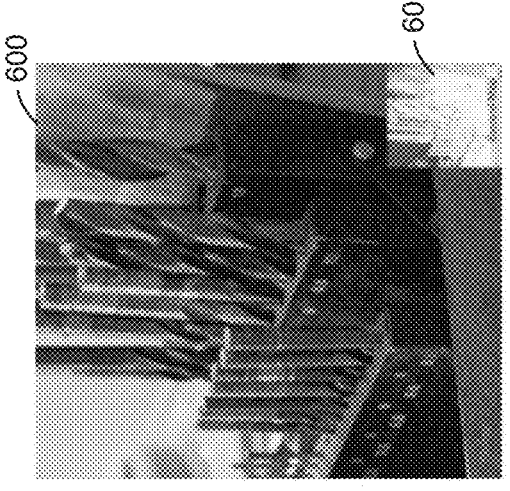
FIG. 6A illustrates an exemplar noisy image, according to various embodiments.

FIGS. 6A-6B illustrate an example of denoising an image using denoising model 150, according to various embodiments. FIG. 6A illustrates an exemplar noisy image 600 and an exemplar denoising strength control map 601. The control map 601 is used to control the amount of denoising performed by the denoising model 150, as described above in conjunction with FIG. 3. In this example, darker pixel values in the control 601 map correspond to lower denoising strength, which can preserve more texture detail in the denoised frame, and vice versa.

FIG. 6B illustrates an exemplar denoised image 602 generated by processing the noisy image 600 and the control map 601 using the denoising model 150. As shown, the denoised image 602 appears realistic and includes relatively few artifacts, such as noise dragging artifacts.

Figure 7:
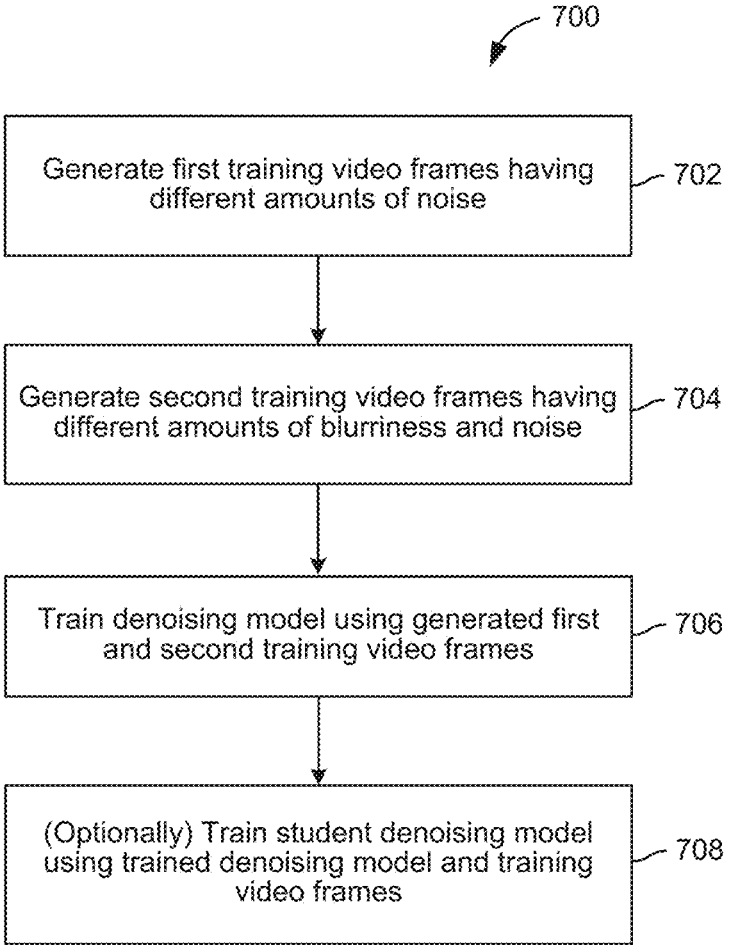
FIG. 7 sets forth a flow diagram of method steps for training a denoising model, according to various other embodiments.

FIG. 7 sets forth a flow diagram of method steps for training a denoising model, according to various other embodiments. Although the method steps are described in conjunction with the systems of FIGS. 1-3 and 5, persons of ordinary skill in the art will understand that any system configured to perform the method steps, in any order, is within the scope of the present disclosure.

As shown, a method 700 begins at step 702, where the model trainer 116 generates first training video frames having different amounts of noise. In some embodiments, the model trainer 116 can add different amounts of any technically feasible type of noise, such as Gaussian noise, to reference video frames to generate the first training video frames having different amounts of noise.

At step 704, the model trainer 116 generates second training video frames having different amounts of blurriness and noise. In some embodiments, the model trainer 116 can add different amounts of any technically feasible type of blur, such as Gaussian blur, to reference video frames to generate blurred video frames. In such cases, the model trainer 116 can also add noise to the blurred video frames to generate the second training video frames having different amounts of blurriness and noise.

At step 706, the model trainer 116 trains a denoising model using the first and second training video frames generated at steps 702 and 704, respectively. In some embodiments, the denoising model is trained to take as inputs consecutive frames of a video and control maps specifying an amount of denoising and an amount of sharpening to perform, and to output consecutive denoised frames. In some embodiments, the denoising model can be the denoising model 150, described above in conjunction FIGS. 2-3 and 5. In some embodiments, the denoising model can be trained to minimize the loss function of equation (1), which includes the reconstruction loss of equation (2) and the temporal loss of equation (3).

At optional step 708, the model trainer 116 trains a student denoising model using the trained denoising model and the training video frames. In some embodiments, the student denoising model can be the student denoising model 500, described above in conjunction with FIG. 5. In some embodiments, the student denoising model can be trained to minimize the loss function that includes the feature loss of equation (4) and the reconstruction loss of equation (5).

Figure 8:
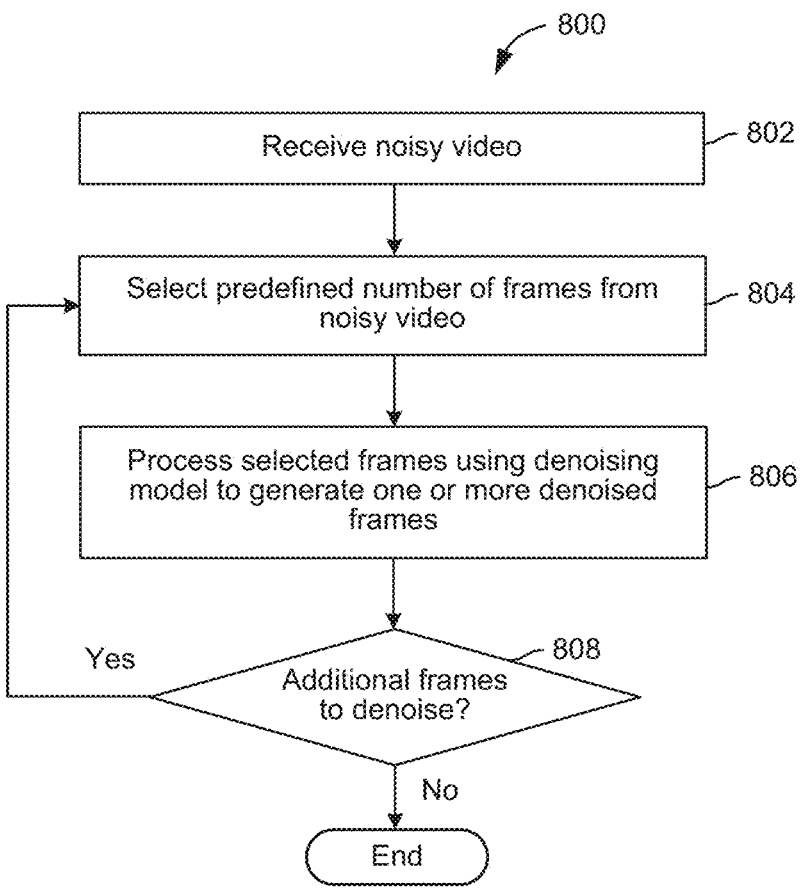
FIG. 8 sets forth a flow diagram of method steps for denoising a video, according to various other embodiments.

FIG. 8 sets forth a flow diagram of method steps for denoising a video, according to various other embodiments. Although the method steps are described in conjunction with the system of FIGS. 1-3, persons of ordinary skill in the art will understand that any system configured to perform the method steps, in any order, is within the scope of the present disclosure.

As shown, a method 800 begins at step 802, where the denoising application 146 receives a noisy video. For example, the noisy video can be a video that is captured using a camera or a video that is rendered.

At step 804, the denoising application 146 selects a predefined number of consecutive frames from the noisy video. For example, the denoising application 146 could select five frames, or any suitable predefined number of frames, that a denoising model is trained to take as inputs.

At step 806, the denoising application 146 processes the selected frames using a denoising model to generate one or more denoised frames. When multiple denoised frames are generated, the denoised frames are consecutive frames. In some embodiments, the denoising model can be the denoising model 150, described above in conjunction with FIGS. 2-3 and 5. In some embodiments, the denoising model can be the student denoising model 500, described above in conjunction with FIG. 5.

At step 808, if there are additional frames to denoise, then the method 800 returns to step 804, where the denoising application 146 selects another predefined number of frames from the video for processing. In some embodiments, the selected frames can overlap previously selected frames when the number of frames (e.g., three frames) that are output by the denoising model are less than the number of selected frames (e.g., five frames) that are input into the denoising model.

Although described herein primarily with respect to video frames, techniques disclosed herein can also be used to denoise standalone images. For example, in some embodiments, a denoising model can be trained to take as input one or more noisy images and output a denoised image.

In sum, techniques are disclosed for denoising videos. In some embodiments, video frames are denoised using a denoising model that includes an encoder-decoder architecture and attention modules. During training of the denoising model, the attention modules learn weightings to upweight certain dimensions of input features to help pixel registration, remove ghosting artifacts, and improve temporal consistency when the frames of a video are being denoised. The denoising model can also be used to train a student denoising model that has a same architecture as, but is smaller and faster than, the denoising model. After training, noisy video frames can be input into the denoising model and/or the student denoising model to generate corresponding denoised video frames.

At least one technical advantage of the disclosed denoising techniques relative to the prior art is that the disclosed techniques generate denoised images that include fewer unwanted artifacts relative to the denoised images produced by conventional techniques for denoising images. In addition, the disclosed techniques denoise an image without requiring the noise characteristics or a mask of an image to be previously specified. These technical advantages represent one or more technological improvements over prior art approaches.

1. In some embodiments, a computer-implemented method for denoising videos comprises receiving a video that includes a plurality of frames, and processing one or more frames included in the plurality of frames using a denoising model to generate one or more denoised frames, wherein the denoising model includes one or more attention modules, and each attention module weights one or more dimensions of a plurality of features that are input into the attention module.

2. The computer-implemented method of clause 1, wherein the plurality of features is output by a layer of the denoising model, and the weighting of the one or more dimensions of the plurality of features is based on the plurality of features and a plurality of spatial locations associated with the plurality of features.

3. The computer-implemented method of clauses 1 or 2, wherein the denoising model further includes an encoder that encodes the one or more frames to generate one or more latent representations and a decoder that decodes the one or more latent representations to generate the one or more denoised frames.

4. The computer-implemented method of any of clauses 1-3, further comprising receiving a control map specifying an amount of denoising to perform, and processing the one or more frames further based on the control map.

5. The computer-implemented method of any of clauses 1-4, further comprising receiving a control map specifying an amount of sharpening to perform, and processing the one or more frames further based on the control map.

6. The computer-implemented method of any of clauses 1-5, further comprising adding a plurality of amounts of noise to a set of frames to generate a plurality of sets of noisy frames, wherein each set of noisy frames includes a different amount of noise, and training the denoising model based on the plurality of sets of noisy frames.

7. The computer-implemented method of any of clauses 1-6, further comprising adding a plurality of amounts of blur to a set of frames to generate a plurality of sets of blurry frames, wherein each set of blurry frames includes a different amount of blur, adding noise to the plurality of sets of blurry frames to generate a plurality of sets of noisy frames, and training the denoising model based on the plurality of sets of noisy frames.

8. The computer-implemented method of any of clauses 1-7, further comprising training a second denoising model, and training the denoising model based on the second denoising model.

9. The computer-implemented method of any of clauses 1-8, further comprising training the denoising model based on a loss function that accounts for (i) a reconstruction difference between one or more additional denoised frames output by the denoising model and one or more reference frames, and (ii) a temporal consistency between the one or more additional denoised frames.

10. In some embodiments, one or more non-transitory computer-readable storage media include instructions that, when executed by one or more processing units, cause the one or more processing units to perform steps for denoising videos, the steps comprising receiving a video that includes a plurality of frames, and processing one or more frames included in the plurality of frames using a denoising model to generate one or more denoised frames, wherein the denoising model includes one or more attention modules, and each attention module weights one or more dimensions of a plurality of features that are input into the attention module.

11. The one or more non-transitory computer-readable storage media of clause 10, wherein the plurality of features is output by a layer of the denoising model, and the weighting of the one or more dimensions of the plurality of features is based on the plurality of features and a plurality of spatial locations associated with the plurality of features.

12. The one or more non-transitory computer-readable storage media of clauses 10 or 11, wherein the denoising model further includes an encoder that encodes the one or more frames to generate one or more latent representations and a decoder that decodes the one or more latent representations to generate the one or more denoised frames.

13. The one or more non-transitory computer-readable storage media of any of clauses 10-12, wherein the instructions, when executed by one or more processing units, further cause the one or more processing units to perform the steps of receiving a control map specifying an amount of denoising to perform, and processing the one or more frames further based on the control map.

14. The one or more non-transitory computer-readable storage media of any of clauses 10-13, wherein the instructions, when executed by one or more processing units, further cause the one or more processing units to perform the steps of receiving a control map specifying an amount of sharpening to perform, and processing the one or more frames further based on the control map.

15. The one or more non-transitory computer-readable storage media of any of clauses 10-14, wherein the instructions, when executed by one or more processing units, further cause the one or more processing units to perform the steps of adding a plurality of amounts of noise to a set of frames to generate a plurality of sets of noisy frames, wherein each set of noisy frames includes a different amount of noise, and training the denoising model based on the plurality of sets of noisy frames.

16. The one or more non-transitory computer-readable storage media of any of clauses 10-15, wherein the instructions, when executed by one or more processing units, further cause the one or more processing units to perform the steps of adding a plurality of amounts of blur to a set of frames to generate a plurality of sets of blurry frames, wherein each set of blurry frames includes a different amount of blur, adding noise to the plurality of sets of blurry frames to generate a plurality of sets of noisy frames, and training the denoising model based on the plurality of sets of noisy frames.

17. The one or more non-transitory computer-readable storage media of any of clauses 10-16, wherein the instructions, when executed by one or more processing units, further cause the one or more processing units to perform the steps of training a second denoising model, and training the denoising model based on the second denoising model.

18. The one or more non-transitory computer-readable storage media of any of clauses 10-17, wherein the instructions, when executed by one or more processing units, further cause the one or more processing units to perform the step of training the denoising model based on a loss function that accounts for (i) a reconstruction difference between one or more additional denoised frames output by the denoising model and one or more reference frames, and (ii) a temporal consistency between the one or more additional denoised frames.

19. In some embodiments, a system comprises one or more memories storing instructions, and one or more processors that are coupled to the one or more memories and, when executing the instructions, are configured to receive a video that includes a plurality of frames, and process one or more frames included in the plurality of frames using a denoising model to generate one or more denoised frames, wherein denoising model includes one or more attention modules, and each attention module weights one or more dimensions of a plurality of features that are input into the attention module.

20. The system of clause 19, wherein the plurality of features is output by a layer of the denoising model, and the weighting of the one or more dimensions of the plurality of features is based on the plurality of features and a plurality of spatial locations associated with the plurality of features.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-program-mable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for denoising videos, the method comprising:

receiving a video that includes a plurality of frames; and processing one or more frames included in the plurality of frames using a denoising model that includes an encoder and a decoder to generate one or more denoised frames, wherein the encoder includes one or more encoder blocks and the decoder includes one or more decoder blocks, and each of the one or more encoder blocks and the one or more decoder blocks includes a three-dimensional (3D) convolutional layer and an attention module that calculates (i) a first set of weights for a plurality of feature channels associated with a plurality of features and (ii) a second set of weights for a spatial dimension associated with the plurality of features.

2. The computer-implemented method of claim 1, wherein an output of the 3D convolutional layer included in each of the one or more encoder blocks and each of the one or more decoder blocks is multiplied with another output of a corresponding attention module to generate the first set of weights and the second set of weights.

3. The computer-implemented method of claim 1, wherein the first set of weights and the second set of weights calculated by the attention module in a first encoder block included in the one or more encoder blocks are added to a corresponding plurality of features to generate a plurality of weighted features that are input into a second encoder block included in the one or more encoder blocks.

4. The computer-implemented method of claim 1, further comprising:

receiving a control map specifying an amount of denoising to perform; and processing the one or more frames further based on the control map.

5. The computer-implemented method of claim 1, further comprising:

receiving a control map specifying an amount of sharpening to perform; and processing the one or more frames further based on the control map.

6. The computer-implemented method of claim 1, further comprising:

adding a plurality of amounts of noise to a set of frames to generate a first plurality of sets of noisy frames, wherein each set of noisy frames includes a different amount of noise; and training the denoising model based on the first plurality of sets of noisy frames.

7. The computer-implemented method of claim 6, further comprising:

adding a plurality of amounts of blur to the set of frames to generate a plurality of sets of blurry frames, wherein each set of blurry frames includes a different amount of blur;

adding noise to the plurality of sets of blurry frames to generate a second plurality of sets of noisy frames; and training the denoising model based on the second plurality of sets of noisy frames.

8. The computer-implemented method of claim 1, further comprising:

training a second denoising model that is larger than the denoising model; and training the denoising model based on a feature loss computed between distilled information from an adaptation layer of the second denoising model and feature maps from the denoising model.

9. The computer-implemented method of claim 1, further comprising training the denoising model based on a loss function that accounts for (i) a reconstruction difference between one or more additional denoised frames output by the denoising model and one or more reference frames; and (ii) a temporal consistency between the one or more additional denoised frames.

10. One or more non-transitory computer-readable storage media including instructions that, when executed by one or more processing units, cause the one or more processing units to perform steps for denoising videos, the steps comprising:

receiving a video that includes a plurality of frames; and processing one or more frames included in the plurality of frames using a denoising model that includes an encoder and a decoder to generate one or more denoised frames, wherein the encoder includes one or more encoder blocks and the decoder includes one or more decoder blocks, and each of the one or more encoder blocks and the one or more decoder blocks includes a three-dimensional (3D) convolutional layer and an attention module that calculates (i) a first set of weights for a plurality of feature channels associated with a plurality of features and (ii) a second set of weights for a spatial dimension associated with the plurality of features.

11. The one or more non-transitory computer-readable storage media of claim 10, wherein an output of the 3D convolutional layer included in each of the one or more encoder blocks and each of the one or more decoder blocks is multiplied with another output of a corresponding attention module to generate the first set of weights and the second set of weights.

12. The one or more non-transitory computer-readable storage media of claim 10, wherein the encoder encodes the one or more frames to generate one or more latent representations and the decoder decodes the one or more latent representations to generate the one or more denoised frames.

13. The one or more non-transitory computer-readable storage media of claim 10, wherein the instructions, when executed by one or more processing units, further cause the one or more processing units to perform the steps of:

receiving a control map specifying an amount of denoising to perform; and processing the one or more frames further based on the control map.

14. The one or more non-transitory computer-readable storage media of claim 10, wherein the instructions, when executed by one or more processing units, further cause the one or more processing units to perform the steps of:

receiving a control map specifying an amount of sharpening to perform; and processing the one or more frames further based on the control map.

15. The one or more non-transitory computer-readable storage media of claim 10, wherein the instructions, when executed by one or more processing units, further cause the one or more processing units to perform the steps of:

adding a plurality of amounts of noise to a set of frames to generate a plurality of sets of noisy frames, wherein each set of noisy frames includes a different amount of noise; and training the denoising model based on the plurality of sets of noisy frames.

16. The one or more non-transitory computer-readable storage media of claim 10, wherein the instructions, when executed by one or more processing units, further cause the one or more processing units to perform the steps of:

adding a plurality of amounts of blur to a set of frames to generate a plurality of sets of blurry frames, wherein each set of blurry frames includes a different amount of blur;

adding noise to the plurality of sets of blurry frames to generate a plurality of sets of noisy frames; and training the denoising model based on the plurality of sets of noisy frames.

17. The one or more non-transitory computer-readable storage media of claim 10, wherein the instructions, when executed by one or more processing units, further cause the one or more processing units to perform the steps of:

training a second denoising model; and training the denoising model based on a feature loss computed between distilled information from an adaptation layer of the second denoising model and feature maps from the denoising model.

18. The one or more non-transitory computer-readable storage media of claim 10, wherein the instructions, when executed by one or more processing units, further cause the one or more processing units to perform the step of training the denoising model based on a loss function that accounts for (i) a reconstruction difference between one or more additional denoised frames output by the denoising model and one or more reference frames; and (ii) a temporal consistency between the one or more additional denoised frames.

19. A system, comprising:

one or more memories storing instructions; and one or more processors that are coupled to the one or more memories and, when executing the instructions, are configured to:

receive a video that includes a plurality of frames, and process one or more frames included in the plurality of frames using a denoising model that includes an encoder and a decoder to generate one or more denoised frames, wherein the encoder includes one or more encoder blocks and the decoder includes one or more decoder blocks, and each of the one or more encoder blocks and the one or more decoder blocks includes a three-dimensional (3D) convolutional layer and an attention module that calculates (i) a first set of weights for a plurality of feature channels associated with a plurality of features and (ii) a second set of weights for a spatial dimension associated with the plurality of features.

20. The system of claim 19, wherein an output of the 3D convolutional layer included in each of the one or more encoder blocks and each of the one or more decoder blocks is multiplied with another output of a corresponding attention module to generate the first set of weights and the second set of weights.

* * * * *